US006400767B1

(12) United States Patent
Nuber et al.

(10) Patent No.: US 6,400,767 B1
(45) Date of Patent: Jun. 4, 2002

(54) COMMUNICATION OF HBI DATA IN DIGITAL TELEVISION DATA STREAMS

(75) Inventors: Ray Nuber, Rancho Palos Verdes; G. Kent Walker, Escondido, both of CA (US)

(73) Assignee: General Instrument Corporation, Horsham, PA (US)

( * ) Notice: Subject to any disclaimer, the term of this patent is extended or adjusted under 35 U.S.C. 154(b) by 0 days.

(21) Appl. No.: 09/156,484

(22) Filed: Sep. 18, 1998

Related U.S. Application Data

(63) Continuation-in-part of application No. 08/783,432, filed on Jan. 16, 1997, now Pat. No. 5,844,615.
(51) Int. Cl.[7] .................. H04N 7/025; H04N 7/088
(52) U.S. Cl. ............ 375/240.26; 348/467; 348/476
(58) Field of Search .............. 375/240.26, 240.01, 375/240.25; 348/467, 473, 476, 479, 716; H04N 7/025, 7/088

(56) References Cited

U.S. PATENT DOCUMENTS

| 4,853,796 A | * 8/1989 | Suesada et al. ............. 348/472 |
| 4,862,268 A | 8/1989 | Campbell et al. ........... 348/467 |
| 5,289,276 A | 2/1994 | Siracusa et al. ....... 375/240.01 |
| 5,400,401 A | 3/1995 | Wasilewski et al. ........ 348/473 |
| 5,493,339 A | 2/1996 | Birch et al. ................. 348/467 |
| 5,519,780 A | 5/1996 | Woo et al. ................... 348/467 |
| 5,526,427 A | 6/1996 | Thomas et al. ............. 348/467 |
| 5,699,124 A | 12/1997 | Nuber et al. ................ 348/467 |
| 5,717,461 A | 2/1998 | Hoogenboom .............. 348/716 |
| 5,844,615 A | * 12/1998 | Nuber et al. ........... 375/240.01 |

OTHER PUBLICATIONS

Advanced Television Systems Committee, Document A/53, "ATSC Digital Television Standard," Annex A, "Video Systems Characteristics", Sep. 16, 1995.

* cited by examiner

Primary Examiner—Howard Britton
(74) Attorney, Agent, or Firm—Barry R. Lipsitz

(57) ABSTRACT

A method and apparatus are provided for communicating HBI user information in digital television data streams via a generic syntax. The syntax allows the digital transport of virtually any type of user data that may be carried in the HBI or overscan portion of an analog television signal. A pixel generator is used to insert HBI data into a digital video signal using information provided in the user portion of the digital data stream. The syntax provides the pixel generator with the start time of the first symbol, the number of pixels per symbol, the high and low levels to insert, the fraction of the symbol time that is transition time, the number of symbols to insert and the first frame line number on which to insert the data.

19 Claims, 5 Drawing Sheets

COMMUNICATION OF HBI DATA IN DIGITAL TELEVISION DATA STREAMS

This application is a continuation-in-part of copending U.S. patent application Ser. No. 08/783,432 filed on Jan. 16, 1997, now U.S. Pat. No. 5,844,615.

BACKGROUND OF THE INVENTION

The present invention relates to the communication of digital television signals, and more particularly to a bandwidth efficient scheme for enabling a digital television data stream to carry most types of data conventionally carried in the horizontal blanking interval (HBI) of an analog television signal. Such data is generally pulse amplitude modulated (PAM) data that is modulated onto the luminance of the HBI portion of the analog video waveform.

Digital transmission of television signals can deliver video and audio services of much higher quality than analog techniques. Digital transmission schemes are particularly advantageous for signals that are broadcast via a cable television network or by satellite to cable television affiliates and/or directly to home satellite television-receivers. It is expected that digital television transmitter and receiver systems will replace existing analog systems just as digital compact discs have replaced analog phonograph records in the audio industry.

One way to transmit the compressed video data to a receiver is in the form of packets contained within a packetized data stream. Typically, packets carrying compressed video data are multiplexed with other packets, e.g., carrying corresponding audio data and control information necessary to reconstruct a television signal. One standard for transporting digital television signals in this manner is the MPEG-2 standard, details of which can be found in the International Organisation for Standardisation, ISO/IEC 13818-1, International Standard, Nov. 13, 1994 entitled "Generic Coding of Moving Pictures and Associated Audio: Systems," recommendation H.222.0, incorporated herein by reference. Further details of the video syntax and semantics for MPEG-2 video can be found in International Organisation for Standardisation, ISO/IEC 13818-2, International Standard, 1995 entitled "Generic Coding of Moving Pictures and Associated Audio: Video," recommendation H.262, also incorporated herein by reference.

Another standard for transporting digital television data in a packet stream is the Advanced Television Systems Committee (ATSC) Digital Television Standard A/53, approved on April 12 and Sep. 15, 1995, incorporated herein by reference. The ATSC Digital Television Standard is based on the ISO/IEC MPEG-2 Video Standard, the Digital Audio Compression (AC-3) Standard, and the ISO/IEC MPEG-2 Systems Standard.

In the ATSC and MPEG-2 systems (and the similar DigiCipher® II system proprietary to General Instrument Corporation, the assignee hereof) a transport stream, or transport multiplex is made up of a contiguous set of fixed length packets. The video sequence is transported using a hierarchical structure in which a sequence header is followed by various extensions, user data, a group of pictures ("GOP") header, optional user data, a picture header, etc. The sequence header provides information for a sequence of pictures, which in general will include more than one GOP. This information includes, for example, horizontal and vertical size values, aspect ratio, frame and bit rate, and quantization parameters for the video data. A user data extension can also be included which, among other things, provides additional data for use by decoders. The DigiCipher® II standard provides for the transport of additional user data after the sequence header, in order to identify a DigiCipher® II signal and the use of any special video compression techniques used within a sequence, including DigiCipher® special prediction and block motion estimation.

In both the MPEG-2 and DigiCipher® II syntaxes, a sequence display extension containing, e.g., video format and color description information, is provided in addition to the sequence extension and user data. A subsequent group of pictures header provides, among other information, a time code. Thereafter, a picture header is provided which includes various information pertaining to a corresponding picture in a sequence of pictures to be displayed. A picture extension and, ultimately, the actual picture data to be decoded and reproduced for viewing, is then provided. It is noted that MPEG does not specify the order in which various extensions (such as the sequence display extension) or the user data must be transmitted beyond the fact that they must be after the sequence extension and before the GOP header (if provided) or the picture header. MPEG does not require GOP headers to be sent, and such headers may be bypassed in particular implementations.

In a practical transmission system it may be necessary to include additional data at different times for specific purposes, such as controlling new features of a video appliance and peripherals for such appliances. Such additional data may be carried in the horizontal blanking interval (HBI) portions of an analog television signal, and is referred to herein as "HBI user information", "user data", or "user information."

Many methods have been developed for services provided via waveforms carried in the HBI lines of analog and composite video. Digital video compression systems tend to employ algorithms optimized for the characteristics of two dimensional motion video. These algorithms are not generally well suited for the compression of video waveforms present in the HBI lines of analog video.

The character of HBI waveforms is very different compared to active video. Lack of compression for these lines is very bandwidth intensive, such as sending 8 or 10 bit samples of luminance and chrominance pixels. For example, 14 luminance and chrominance values at 8 bit resolution for 470 lines per frame and 30 frames per second requires 3,158,400 bps while the information conveyed by these lines only represents 14,100 bps for Microsoft's Data Broadcasting Service. As the transition to digital video proceeds, the demand for carriage and reconstruction of HBI services continues. Digital video distribution systems are expected to reconstruct the HBI waveforms as well as the active video, even when digital video compression techniques are employed. Thus, there is a need for algorithms, syntax and semantics specifically for the compression of the HBI portion of the video lines that will allow an efficient and flexible alternative to developing HBI-waveform specific user data syntax and semantics.

It would be advantageous to provide a generic transport syntax and semantics for digital television data that would accommodate various types of HBI user information which may or may not be used at any given time. Such a scheme would enable the economical management of bandwidth while providing flexibility as to the transport of HBI user information. The present invention provides a transport method and apparatus enjoying the aforementioned advantages.

SUMMARY OF THE INVENTION

In accordance with the present invention, a method is provided for communicating, in a digital television data stream, user information of a type conventionally carried as pulse amplitude modulation (PAM) data in a horizontal blanking interval (HBI) waveform or video overscan region of an analog television signal. The digital television data stream transports data according to a convention that includes a user data syntax. Such conventions include, without limitation, the MPEG-2, ATSC and DigiCipher II digital television standards. In accordance with the method, the conventional user data syntax is supplemented with a line indicator value specifying the first horizontal television field line(s) in which user information is carried as PAM data in a counterpart analog television signal. The user data syntax is also supplemented with at least one timing reference value that defines a relationship between a symbol rate of the PAM data and a reference clock of the digital television data stream. The user data syntax is then supplemented with a user information field sufficient to carry the user information.

The user data syntax can be further supplemented with a start sample value. The start sample value is indicative of a sample point at which a transition into a first luminance (luma) PAM symbol is to commence in a counterpart television signal reconstructed from the digital television data stream.

The user data syntax can be further supplemented with a first amplitude value indicative of an amplitude at which HBI luminance PAM symbols are to appear in the counterpart television signal that is reconstructed from the digital television data stream.

The user data syntax can be further supplemented with a pulse shape value indicative of a pulse shape that is to be provided for the HBI Luminance PAM symbols in the counterpart television signal reconstructed from the digital television data stream. Moreover, the user data syntax can be supplemented with a field number indicative of a television field in which corresponding HBI data is to be inserted in the counterpart television signal reconstructed from the digital television data stream.

The user data syntax can also be supplemented with a second amplitude value indicative of a second amplitude level of the HBI luminance PAM symbols.

As indicated above, the user data syntax is supplemented with a timing reference value. This value can comprise a HBI Luminance PAM symbol clock increment value and a HBI Luminance PAM modulus value. The symbol clock increment and modulus values are related to the PAM symbol rate and the reference clock as follows:

$$\frac{\text{increment value}}{\text{modulus value}} = \frac{\text{symbol rate}}{\text{reference clock}}$$

The count value can comprise a word count indicating an integer number of HBI Luminance PAM words that follow and a remainder count indicating a number of HBI Luminance PAM bits totaling less than a full HBI Luminance PAM word that follow. The syntax thereby provides an efficient use of bandwidth by enabling remainders of less than a full PAM word to be communicated. In a specific embodiment, such as an MPEG-2 or ATSC implementation, the HBI Luminance PAM words are each 22 bits in length, and the method comprises the further step of inserting a marker bit after each HBI Luminance PAM word to guard against a false MPEG start code. The user information can be carried according to the user data syntax as HBI Luminance PAM words and HBI Luminance PAM bits. Each HBI Luminance PAM word comprises a string of HBI Luminance PAM symbols with the first bit corresponding to a first HBI Luminance PAM symbol to be reconstructed on a video line as displayed from left to right and then top to bottom. Each HBI Luminance PAM bit represents one or part of an HBI Luminance PAM symbol to be reconstructed on the video line. The HBI Luminance PAM bits are provided in the order in which their symbols are to be reconstructed on the video line subsequent to symbols reconstructed from any HBI Luminance PAM words, as displayed from left to right and then top to bottom.

Receiver apparatus is provided for decoding, from a digital television data stream, user information of a type conventionally carried as PAM data in a horizontal blanking interval waveform or video overscan region of an analog television signal. The digital television data stream transports data according to a convention that includes a user data syntax. A syntax processor detects information carried in accordance with the user data syntax. Such information includes a first value identifying first horizontal television line(s) in which particular user information is carried in a counterpart television signal. A second value identifies a relationship between a PAM symbol rate of the counterpart television signal and a digital television data reference clock. A third value indicates an amount of user information carried in the digital television data stream. The information carried in accordance with the user data syntax also includes the actual user information to be conveyed. A reconstruction processor is responsive to the first, second and third values for formatting the user information into HBI PAM data. An HBI inserter is provided for inserting the HBI PAM data into, for example, a digital television signal from which an analog television signal can be reconstructed. Alternatively, such a digital television signal can be directly recorded or reproduced by a digital television appliance such as a video recorder or digital television.

In the illustrated embodiment, the syntax processor detects a start sample value indicative of a sample point at which a transition into a first PAM symbol is to commence on each line in the reconstructed television signal. The HBI inserter is responsive to the start sample value for inserting the PAM data into the reconstructed television signal. The syntax processor detects a first amplitude value indicative of an amplitude at which PAM symbols are to appear in the reconstructed television signal. The reconstruction processor is responsive to the first amplitude value to provide the HBI PAM data at the amplitude indicated by the first amplitude value.

The syntax processor of the illustrated embodiment detects a pulse shape value indicative of a pulse shape that is to be provided for the PAM symbols in the reconstructed television signal. The reconstruction processor is responsive to the pulse shape value to provide the HBI PAM data with the pulse shape indicated.

The syntax processor can further detect a field number indicative of a television field in which corresponding HBI data is to be inserted in the reconstructed television signal. The HBI inserter is responsive to the field number for inserting the corresponding HBI data into a proper field.

A second amplitude value can be provided for detection by the syntax processor. The second amplitude value is indicative of a second amplitude at which PAM symbols are to appear in the reconstructed television signal. In such an embodiment, the reconstruction processor is responsive to the first and second amplitude values to provide the HBI PAM data at the first and second amplitudes.

DETAILED DESCRIPTION OF THE INVENTION

Figure 1:
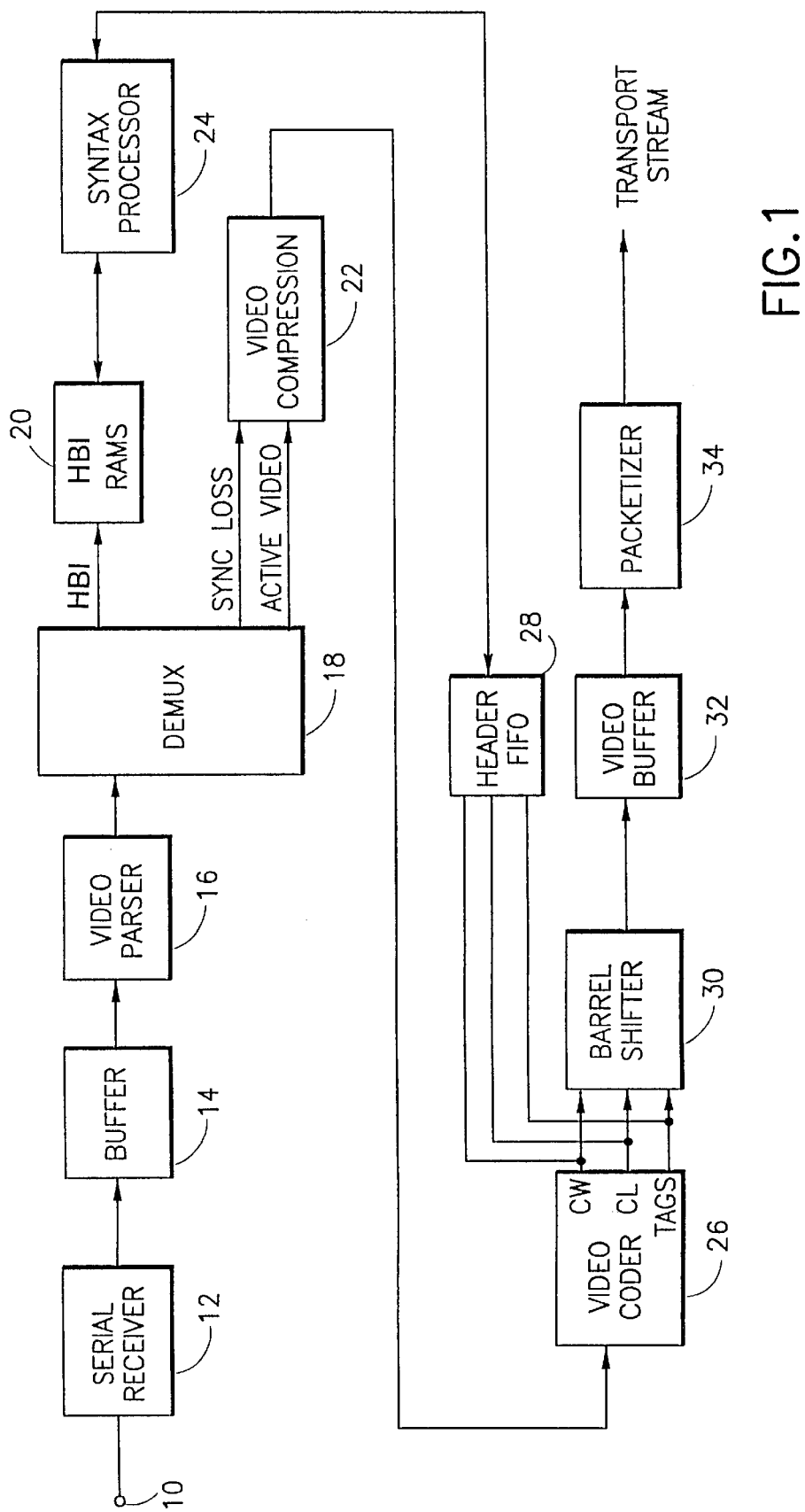
FIG. 1 is a block diagram of a digital video encoder that incorporates the present invention.

The present invention provides a bandwidth efficient method and apparatus for using a digital television data stream to transport variable amounts of different types of information conventionally carried in the HBI portion of an analog television signal. The information of concern is a subset of a type of user data referred to as "picture user data" to distinguish it from "sequence user data" in an MPEG, ATSC or DigiCipher® II transport stream. This subset, referred to herein as HBI user information, comprises information such as Microsoft's Data Broadcasting Service and Yes! Entertainment Corporation's applications. Typically, picture user data is updated each picture. The picture user data is transported in portions of successive video frames which correspond to HBI data.

The present invention resulted from a realization that most HBI and VBI waveforms can be represented as pulse amplitude modulated (PAM) data modulated onto the luminance portion of a video signal. Such waveforms can be classified by their pulse shape, number of pixels per symbol, symbol-to-risetime ratio, waveform start time within the video line, and applicable video system (i.e., video standard). Since none of the standards specify significant frame-to-frame correlation of data, each HBI portion of each video frame can be processed independently of any other video frame.

Moreover, the pulse shape specifications allow the different HBI and VBI waveforms to be categorized into waveforms that require a pulse shape of less than one symbol time in duration (such as non-Teletext waveforms) and waveforms that require a pulse shape of more than one symbol time (such as Teletext waveforms).

The present invention capitalizes on the realizations set forth above with respect to the various different HBI waveform formats to provide a syntax for the-communication of HBI data in a digital television data stream. The invention further capitalizes on these realizations to provide a single state machine that is able to reconstruct most of the various HBI waveforms. The state machine allows the following parameters to be programmable: the field number of the particular first HBI line, the line number of the particular first HBI line, the symbol rate used by the particular HBI waveform, the waveform's CCIR-601 start sample number, the waveform's risetime (symbol to transition duration ratio), the waveform's lowest and highest CCIR-601 value symbols, the number of symbols in the waveform per video field, and the vector of values of the symbols in the particular HBI waveform per video field. As will be appreciated by those skilled in the art, "CCIR-601" is a standard promulgated by the International Radio Consultive Committee for digital component coding and filtering.

Table 1 summarizes the key attributes of the known VBI and HBI waveforms, all of which could be carried in whole or in part in the VBI or HBI or overscan region of one or several lines of video. The standards listed apply to either 525-line (NTSC and PAL/M) or 625-line (PAL excepting PAL/M) video Systems. Each waveform provides some portion as a Timing Reference and Sync Pattern for the purpose of symbol synchronization. As well, each provides a fixed number of Data Bits per video line, some of which may be provided for the purpose of Error Detection. Each modulates the data bits onto the video line via some Modulation technique and employing different Amplitudes to represent different data bit values. Finally, each waveform employs a nominal Symbol Rate (sometimes referenced to the video line rate [fh]) and Pulse (symbol) Shape (often specified with a rise time [tr] or Raised Cosine pulse shape with a particular value of Alpha). The unique attributes of particular standards are highlighted in bold font.

TABLE 1

Summary of VBI Waveform Standards.

| Standard | System | Timing Reference | Sync Pattern | Data Bits | Modulation | Amplitude | Symbol Rate | Pulse Shape |
|---|---|---|---|---|---|---|---|---|
| CC | 525 | 7 sine cycles | 3 bits | 16 | NRZ | 0 & 70 IRE | 32 fh | tr = 240 nsec |
| AMOL I | 525 | sync bits | 7 bits | 41 | NRZ | 5 & 55 IRE | 1 Mbps | tr = 250 nsec |
| AMOL II | 525 | Sync Bits | 8 bits | 88 | NRZ | 5 & 55 IRE | 2 Mbps | tr = 125 nsec |
| NABTS | 525 | sync bits | 16 bits | 272 | NRZ | 0 & 70 IRE | 364 fh | alpha = 1.0 |
| WST | 525 | sync bits | 24 bits | 272 | NRZ | 0 & 66 IRE | 364 fh | alpha = 0.45 |
| WST | 625 | sync bits | 24 bits | 336 | NRZ | 0 & 70 IRE | 444 fh | alpha = 0.45 |
| VITC | 525 | sync bits | 9 pairs of bits distributed | 72 | NRZ | 0 & 570 mV | 455/4 fh | tr = 200 nsec |
| VITC | 625 | sync bits | 9 pairs of bits distributed | 72 | NRZ | 0 & 550 mV | 116 fh | tr = 200 nsec |
| EBU 3217 | 625 | sync bits | 8 bits (16 symbols) | 120 bits (240 symbols) | Bi-Phase | 0 & 500 mV | 2.5 Mbps | |
| Microsoft's Data | 525 | sync bits | unpublished | 1 per line/470 lines per | NRZ | 7.5 & 80 IRE | 1 Mbps | tr = 140 nsec |

TABLE 1-continued

Summary of VBI Waveform Standards.

| Standard | System | Timing Reference | Sync Pattern | Data Bits | Modulation | Amplitude | Symbol Rate | Pulse Shape |
|---|---|---|---|---|---|---|---|---|
| Broadcasting Standard | | | | frame | | | | |
| Yes! Entertainment Corporation's applications | 525 | unpublished | unpublished | 1 per line | unpublished | 7.5 to 100 | 793,651 bps | unpublished |

Various conclusions can be drawn by comparing the different HBI waveforms set forth in Table 1. These include:

1. All of the waveforms can be represented as PAM data modulated onto the luminance of the video signal, even EBU 3217's bi-phase modulated symbols, but the nominal luminance values representing the lowest and highest symbols differ from waveform to waveform.
2. The Pulse Shape specifications polarize the waveforms into those which require a pulse shape of less than one symbol time in duration for the non-Teletext waveforms and the converse for the Teletext waveforms.
3. None of the standards specify significant line-to-line or frame-to-frame correlation of data; thus, it is advantageous to handle each line independently of any other line.
4. VITC's synchronization bits are best simply handled as data bits.
5. The number of CCIR-601 samples per symbol ranges by a factor of 13 over all the waveforms.
6. The symbol-to-risetime ratio ranges from 1.5 to 8.5 over all the non-Teletext waveforms.
7. The symbol rate of the waveforms ranges by a factor of 21.

In view of the above conclusions, it has been determined that a single state machine can be created to reconstruct all of these waveforms if the following parameters are programmable in the state machine:

1. The field number of the particular first HBI portion of a video field,
2. The line number of the particular first HBI portion of a video field,
3. The waveform's symbol rate,
4. The waveform's CCIR-601 start sample number,
5. The waveform's risetime (symbol transition duration),
6. The waveform's CCIR-601 value for the lowest and highest amplitude PAM symbols,
7. The number of symbols in the standard's waveform,
8. The vector of values of the symbols in the particular field's HBI waveform.

A state machine providing programmability of the above parameters for use in reconstructing each of the various HBI waveforms is disclosed below in connection with FIG. 3. Prior to discussing the state machine, the novel syntax of the present invention is disclosed in conjunction with an example embodiment of an encoder and decoder structure.

FIG. 1 illustrates, in block diagram form, an encoder for processing raw digital video data into a user data syntax, referred to herein as "HBI Luminance PAM", in which variable amounts of different types of HBI user information can be communicated in a digital television data stream. The raw digital video, such as video complying with the Society of Motion Picture and Television Engineers (SMPTE) standard is input to a serial receiver 12 via terminal 10. The serial receiver serializes the data which is input in a parallel format. The serialized data is buffered in a buffer 14, which can comprise a conventional first-in first-out (FIFO) register. A video parser 16 interprets the syntax of the serialized data and strips out various information such as that identifying the start of a new line, the start of a new frame, and the raw luminance and chrominance data. The luminance and chrominance data is input to a demultiplexer 18 where it is separated into data portions corresponding to horizontal blanking intervals and overscan regions of successive video frames and the active video portions of those frames. Demultiplexer 18 also determines if synchronization of the acquired data stream has been lost, and if so, outputs a "sync loss" signal to a video compression processor 22, which also receives the active video to be compressed. The video compression processor is a type well known in the art, such as described in U.S. Pat. Nos. 5,376,968; 5,235,419; 5,091, 782; or 5,068,724.

The data contained in the HBI and overscan portions of the digital video input signal is output from demultiplexer 18 to random access memories (RAMs) 20, which include both a luminance RAM and a chrominance RAM. The RAMs store the data until required by a syntax processor 24 which extracts the HBI user information and builds a syntax enabling the information to be transported efficiently in the HBI portions of a digital television data stream to be communicated to a corresponding decoder, e.g., at an end user location.

The syntax provided by the syntax processor is stored in a header FIFO 28, which is used to assemble transport headers for, e.g., an MPEG or DigiCipher® II implementation of the digital television data stream. The header FIFO provides the syntax information to a barrel shifter 30 that combines the header with the compressed active video from a video coder 26. The video coder 26 codes the compressed video from the video compression processor 22 in a well known manner using, for example, Huffman coding to provide codewords (CW), codeword lengths (CL) and data tags which identify the coded information. The output from barrel shifter 30 is a data stream containing the active video separated by headers which contain information necessary to decode the active video. This data stream is stored in a video buffer 32 which provides the data on an as needed basis to a packetizer 34. The packetizer is a conventional component which assembles the data into transport packets in accordance with a transport stream standard such as the ATSC, MPEG-2 or DigiCipher® II digital television standard.

The functions of the syntax processor 24, insofar as they are relevant to the present invention, are described below using the formal grammar used by the ATSC and MPEG transport standards. This grammar is a C-language-like syntax and is a method of describing continuous and possibly variable rate sequences of bits, instead of specifying a procedural program and its functions as in the computer language C. The first column of the syntax contains the syntax element. The second column gives the length of the syntax elements in bits and the third column identifies the syntax type. The types are bslbf (bit string left-most bit first) and uimsbf (unsigned integer most significant bit first). The header "user_data ( ) { . . . }" indicates that the syntax elements within the braces are a named set and may be invoked elsewhere in the syntax by simply using the designation "user_data ( )". A conditional occurrence of bit structures may be indicated with the usual "if" tests. The customary relational operators well known in the C-language are also available. Loop structures are possible and use the standard C loop header syntax. The syntax table is accompanied by a set of semantics, providing definitions for each previously undefined syntax field and placing constraints on their use. The following picture user data bitstream syntax (in which the shaded areas represent the standard ATSC user data syntax and the non-shaded areas represent the syntax of the present invention) and bitstream semantics illustrate a preferred embodiment of the present invention:

Picture User Data Syntax with HBI Luminance PAM Data:

|  | No. of bits | Mnemonic |
|---|---|---|
| user_data( ) { |  |  |
|     user_data_start_code | 32 | bslbf |
|       ATSC_identifier | 32 | bslbf |
|       user_data_type_code | 8 | uimsbf |
|     if (user_data_type_code = ='0x03') { |  |  |
|       process_em_data_flag | 1 | bslbf |
|       process_cc_data_flag | 1 | bslbf |
|       additional_data_flag | 1 | bslbf |
|       cc_count | 5 | uimsbf |
|       em_data | 8 | bslbf |
|       for (i=0 ; i < cc_count ; i++) { |  |  |
|         marker_bits | 5 | '1111 1' |
|           cc_valid | 1 | bslbf |
|           cc_type | 2 | bslbf |
|           cc_data_1 | 8 | bslbf |
|           cc_data_2 | 8 | bslbf |
|       } |  |  |
|       marker_bits | 8 | '1111 1111' |
|       if (additional_data_flag) { |  |  |
|         while( nextbits() != '0000 0000 0000 0000 0000 0001') { |  |  |
|           additional_user_data |  |  |
|         } |  |  |
|       } |  |  |
|     else {if (user_data_type_code = ='Ox06') { |  |  |
|       HBI_luma_PAM_data() |  |  |
|     }else{ |  |  |
|       ATSC_reserved_user_data |  |  |
|     } |  |  |
|     next_start_code() |  |  |
| } |  |  |

HBI Luminance PAM Data Syntax:

|  | No. of bits | Mnemonic |
|---|---|---|
| HBI_luma_PAM_data(){ |  |  |
|     field_number | 2 | uimsbf |
|     start_line | 10 | uimsbf |
|     start_sample | 10 | uimsbf |
|     HBI_PAM_increment | 6 | uimsbf |
|     HBI_PAM_modulus | 10 | uimsbf |
|     bits_per_symbol | 3 | uimsbf |
|     low_amplitude_level | 8 | uimsbf |
|     high_amplitude_level | 8 | uimsbf |
|     symbols_per_line | 4 | uimsbf |
|     pulse_shape | 3 | uimsbf |
|     if (pulse_shape = = "rectangular") { |  |  |
|       symbol_to_transition_ratio | 8 | uimsbf |
|     } |  |  |
|     if (pulse_shape = = "reserved") { |  |  |
|       reserved | 8 | bslbf |
|     } |  |  |
|     word_count | 9 | uimsbf |
|     for (j=0; j<word_count ; j++) { |  |  |

-continued

| | No. of bits | Mnemonic |
|---|---|---|
| marker_bit | 1 | bslbf |
| HBI_luma_PAM_word | 22 | bslbf |
| } | | |
| marker_bit | 1 | bslbf |
| remainder_count | 5 | uimsbf |
| for (j=0 ; j<remainder_count ; j++) { | | |
| HBI_luma_PAM__bit | 1 | bslbf |
| } | | |
| marker_bit | 1 | bslbf |
| while (nextbits() !='0000 0000 0000 0000 0000 0001') { | | |
| additional_type_6_data | | |
| } | | |

HBI Luminance PAM Semantic Extensions:

field_number—The number of the field, in display order, from which the HBI data originated, interpreted in Table 2.

TABLE 2

Field Number for Picture User Data.

| Value | Meaning |
|---|---|
| 00 | Forbidden |
| 01 | 1st display field |
| 10 | 2nd display field |
| 11 | 3rd display field (the repeated field in film mode). | start_line—A 10-bit unsigned integer (values in the range [1:625]) giving the top-most line, within the picture from which the HBI Luminance PAM data originated, as specified in CCIR Report 624-4.

start_sample—A 10-bit unsigned integer (values in the range [0:863]) which indicates the sample of each reconstructed luminance line at which the transition into the first HBI Luminance PAM symbol shall start. start sample shall be in the same units as CCIR Recommendation 601 samples and shall be relative to the first sample of CCIR Recommendation 601 reconstructed frames.

HBI_PAM_increment—A 6-bit unsigned integer (values in the range [1:63]) which indicates the HBI Luminance PAM symbol clock increment value and takes on values that describe, together with HBI_PAM_modulus, the relationship of the HBI Luminance PAM symbol clock to a 27 MHz reference. See the semantics of HBI_PAM_modulus for more semantics relative to HBI_PAM_increment.

HBI_PAM_modulus—A 10-bit unsigned integer (values in the range [2:1023]) which indicates the HBI Luminance PAM symbol clock modulus value and takes on values that describe, together with HBI_PAM_increment, the relationship of the HBI Luminance PAM symbol clock to a 27 MHz reference. Specifically, HBI_PAM_increment and HBI_PAM_modulus are related to the HBI Luminance PAM symbol rate as:

HBI_PAM_increment/HBI_PAM_modulus=HBI Luminance PAM symbol rate/system_clock_frequency where system_clock_frequency is specified in ISO/IEC 13818-1 as 27 MHz ±30 ppm and the value of HBI_PAM_increment must not exceed HBI_PAM_modulus-1.

bits_per_symbol—A 3-bit enumerated type that specifies the number of bits per symbol according to Table 3:

TABLE 3

Bits Per Symbol Encoding.

| bits_per_symbol | Meaning |
|---|---|
| 000 | Forbidden |
| 001 | One-bit per symbol: two-level PAM encoding |
| 010 | Two bits per symbol: four-level PAM coding |
| 011 | Three bits per symbol: eight-level PAM coding |
| 100 | Four bits per symbol: sixteen-level PAM coding |
| 101–111 | Reserved for future use | low_amplitude_level—An 8-bit unsigned integer (values in the range [1:254]) which indicates the amplitude at which HBI Luminance PAM symbols of the lowest amplitude value shall be reconstructed in units of amplitude of CCIR Recommendation 601 reconstructed frames.

high_amplitude_level—An 8-bit unsigned integer (values in the range [1:254}) which indicates the amplitude at which HBI Luminance PAM symbols of the highest amplitude value shall be reconstructed in units of amplitude of CCIR Recommendation 601 reconstructed frames.

symbols_per_line—A 4-bit unsigned integer (values in the range [1:15]) which indicates the number of HBI Luminance PAM symbols that shall be reconstructed in each line of the current picture.

pulse_shape—A 3-bit unsigned integer which indicates the shape of the pulses which shall be used to reconstruct each HBI Luminance PAM symbol. The meaning of pulse_shape is defined in Table 4.

TABLE 4

Pulse Shape.

| pulse_shape | Luminance PAM Pulse Shape |
|---|---|
| 000 | rectangular |
| 001—111 | reserved | symbol_to_transition_ratio—An 8-bit unsigned integer (values in the range [16:255]) which indicates the ratio of each HBI Luminance PAM symbol's duration to each symbol's transition duration between the amplitudes specified by low_amplitude_level and high_amplitude_level and having units of $2^{-4}$ (0.0625). This field describes symbols with a symbol to transition ratio ranging from 1.0 to 15.9375.

word_count—A 9-bit unsigned integer (values in the range [0:419]) which indicates the number of marker_bit and HBI_luma_PAM_word pairs that follow this field.

This syntax defines the sequence of N-bit symbols representing PAM-encoded luminance values defining a portion of each video line's HBI. The value of N is given by the bits_per_symbol parameter. Each symbol is placed most-significant bit first. Symbols defined first represent samples to be reconstructed on the leftmost side of the video line as it is displayed from left to right, line-by-line, from top to bottom of the field indicated by the field_number parameter. For reference, the sequence of N-bit symbols is called the "symbol bit list".

To avoid start-code emulation, a marker bit is inserted between each group of 22 bits taken from the symbol bit list.

HBI_luma_PAM_word—A string representing the next 22 bits of the symbol bit list.

remainder_count—A 5-bit unsigned integer (values in the range [0:21]) which indicates the number of HBI_luma_PAM_bits that follow this field.

HBI_luma_PAM_bit—A single bit of the symbol bit list.

The following example illustrates the use of this syntax:

Given the sequence of 3-bit symbols 1, 1, 1, 7, 1, 1, 1, 2, 3, 0, 4, 5, the word_count would be one, the HBI_luma_PAM word would be (001, 001, 111, 001, 001, 001, 00), the remainder_count would be sixteen, and the remaining bits would be (1 010 011 000 100 101). Further, to reconstruct two symbols per line on three lines for a total of six symbols, and given the symbols of each line are named L (for the leftmost of the two symbols) and R (for the rightmost of the two symbols), with the lines being numbered x, y, and z in order from top-most to bottom-most, the symbols shall be transported in the syntax in the order Lx, Rx, Ly, Ry, Lz, Rz.

The above syntax is assembled by the syntax processor 24 illustrated in FIG. 1. In the preferred embodiment, the syntax processor is implemented in firmware. After the syntax is added to the digital video data, the resultant data stream is packetized and output from packetizer 34 to provide the final transport stream for communication to a population of decoders.

Figure 2:
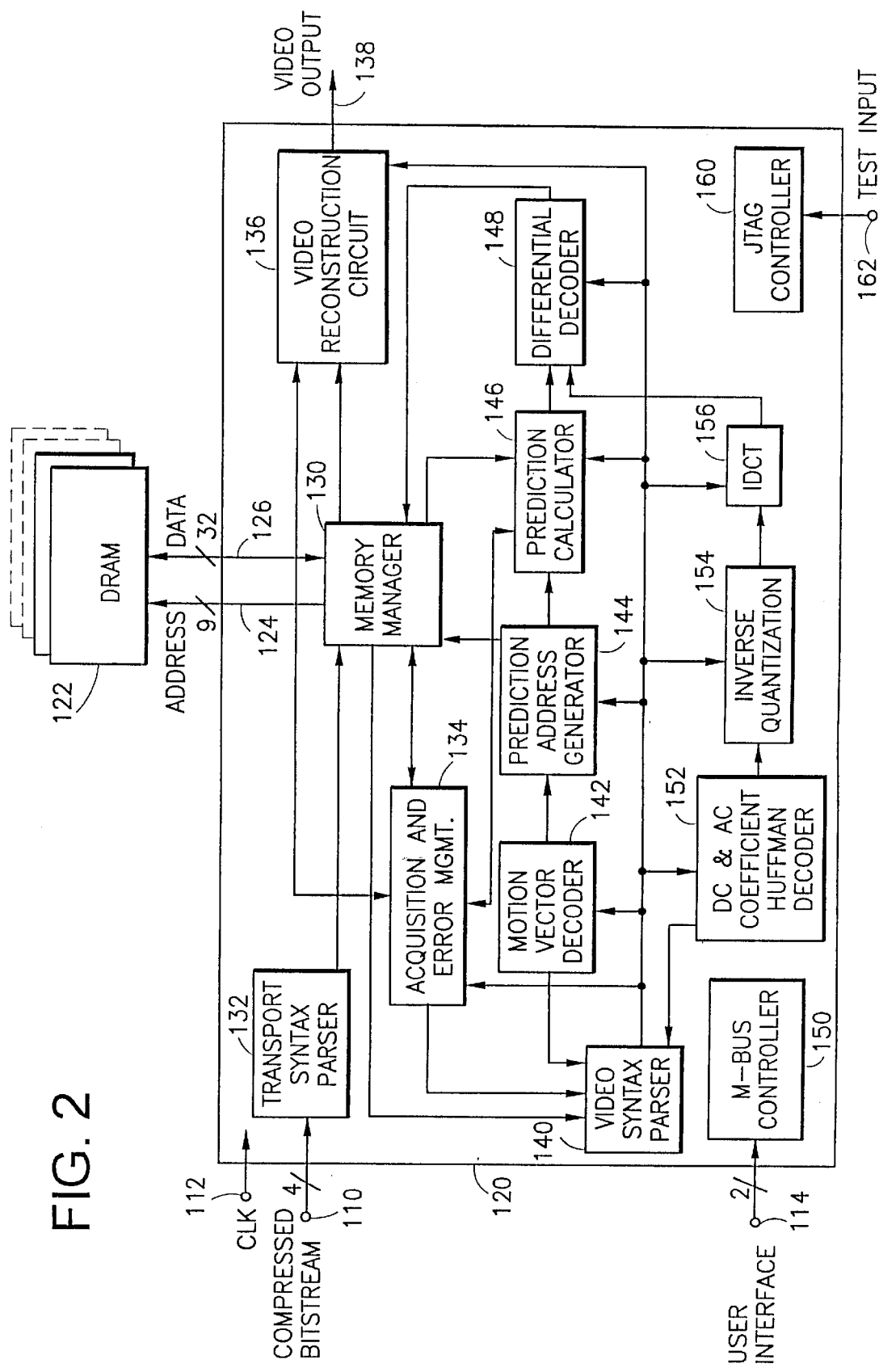
FIG. 2 is a block diagram of a video decompression processor incorporating the present invention.

FIG. 2 is a block diagram of a video decompression processor (i.e., decoder) for processing a received data stream that contains the HBI user data syntax detailed above. The video decompression processor (VDP) incorporates a memory manager 130 that addresses a DRAM 122 to store and retrieve video data necessary to reconstruct a television program at a receiver. The processor, generally designated 120, is a pipelined processor designed to decode both the transport layer (i.e., control and other non-video information) and the video layer of the compressed bitstream input via terminal 110, sometimes referred to as the "transport packet interface" of the video processor.

A user processor interface which can comprise, for example, an M-bus controller 150 is provided at terminal 114 for control of the video data processor. This interface configures various registers in processor 120 as well known in the art.

An interface to the DRAM 122 is provided via address lines 124 and data lines 126. In the example illustrated in FIG. 2, DRAM 122 has a nine bit address port and a thirty-two bit data port.

A video output interface 138 is provided for the decompressed, reconstructed video which may, for example, be output as a standard CCIR 656, eight bit, twenty-seven MHz multiplexed luminance (Y) and chrominance (Cr, Cb) signal.

A test interface can be provided via terminal 162 to a conventional JTAG (Joint Test Action Group) controller 160. JTAG is a standardized boundary scan methodology used for board-level testing to detect faults in package and board connections, as well as internal circuitry.

The video decompression processor 120 receives a clock signal via terminal 112. The clock provides timing information that is used, e.g., to enable a transport syntax parser 132 to recover timing information and video information from transport packets contained in a packetized data stream input via terminal 110. An acquisition and error management circuit 134 utilizes a program clock reference (PCR) and decode time stamp (DTS) detected by a video syntax parser 140 to synchronize the start of picture decoding. This circuit sets vertical synchronization and provides global synchronization for all video decode and display functions.

The video layer is buffered in an input buffer (FIFO) configured in the DRAM 122 by memory manager 130. The video syntax parser 140 receives the compressed video data output from the DRAM FIFO via memory manager 130, and separates the motion vector information from the coefficients describing the video information. The coefficients are processed by a Huffman decoder 152, inverse quantizer 154, and inverse discrete cosine transform (IDCT) processor 156.

Motion vectors are recovered and used to address previously decoded video frames required for reconstructing a current video frame. In particular, a motion vector decoder 142 decodes the motion vectors received from video syntax parser 140 and passes them to a prediction address generator 144. The prediction address generator provides address information necessary to retrieve, via memory manager 130, the necessary anchor frame (i.e., intraframe (I) or prediction (P) frame) data to enable prediction calculator 146 to provide a prediction signal necessary to reconstruct a current frame block. Differential decoder 148 combines the prediction data with the decoded coefficient data to provide decompressed video data. The decompressed data is stored in appropriate buffers of DRAM 122 via memory manager 130. It should be appreciated that the video decompression processes carried out by motion vector decoder 142, prediction address generator 144, prediction calculator 146, differential decoder 148, Huffman decoder 152, inverse quantizer 154 and IDCT 156 are generally conventional and well understood by those skilled in the art.

Memory manager 130 schedules all activity on the DRAM address and data buses 124, 126 and efficiently addresses DRAM 122. The memory manager insures that the data transfer requirements of the input FIFO portion of DRAM 122, the video syntax parser 140 and the video reconstruction circuit 136 (as well as prediction calculator 146 and differential decoder 148) are all met. The video reconstruction circuit 136 calculates a current picture and processes the HBI user data in order to insert any user data present, for output on video output line 138. The video output 138 will contain all of the transmitted HBI user information together with the decompressed active video, in the original format presented to the serial receiver 12 illustrated in FIG. 1.

DRAM 122 is illustrated as an external memory. It should be appreciated that in future implementations, and as memory technology advances, DRAM 122 may be provided as internal memory within the video decompression processor. The DRAM is mapped to provide various decode and output video buffers as well as a circular FIFO buffer for the compressed input video bitstream. The DRAM may also be used to provide a test pattern buffer, a VITS buffer and a closed captioning display reordering buffer as well as to store various picture structure data necessary to properly display the decoded video frames. The DRAM can be reinitialized via memory manager 130 to provide different memory maps as required when variables are modified such as PAL or NTSC video, eight or sixteen Mbit memory configuration, and whether B-frames are present.

As indicated above, the memory manager 130 schedules all of the activity on the DRAM buses including the data transfer requirements of the input FIFO, the video parser and the video reconstruction circuit. The memory manager also performs the required DRAM refresh in a conventional manner. For example, the same row in each of two or four DRAMs can be refreshed simultaneously.

When a packetized bitstream containing compressed video data is input to terminal 110 of video decompression processor 120, video frames represented by the compressed data are reconstructed one at a time. Initially, a full frame of video data will have to be received and stored in DRAM 122. Information for subsequent video frames can comprise a subset of the full video frame which, when added to prediction data from the prior video frame (stored in DRAM 122) will result in the reconstruction of a full frame.

Figure 3:
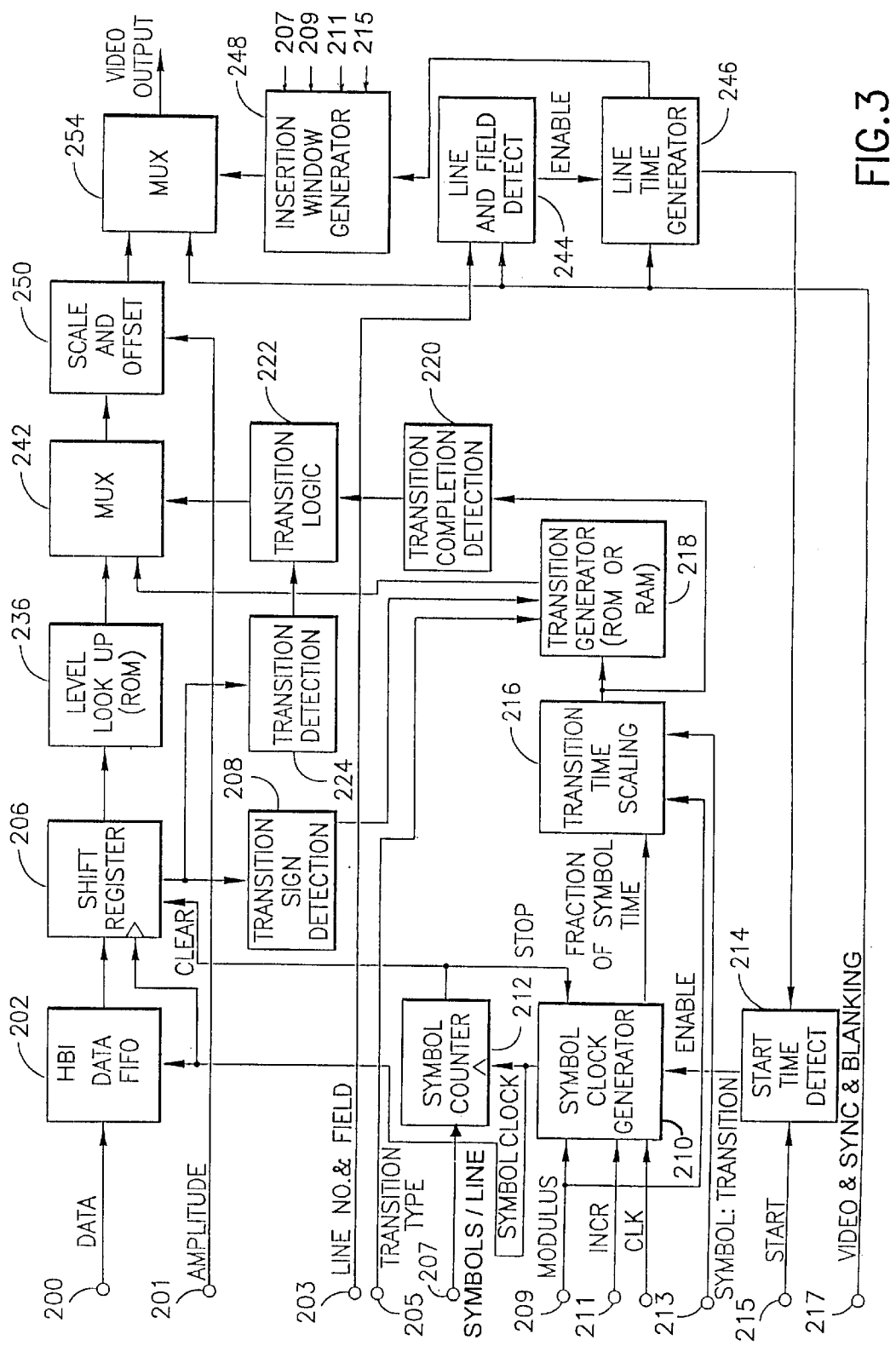
FIG. 3 is a block diagram of a first embodiment of a pixel generator for generating a digital HBI waveform from user data carried in a digital video data stream in accordance with the present invention.

FIG. 3 is a block diagram of a pixel generator for generating a digital HBI waveform from user data carried in a digital video data stream according to the syntax set forth above. The waveform generator is part of the video reconstruction circuit 136 of FIG. 2, and is capable of accommodating the various parameters for the HBI waveforms set forth in Table 1. Each of these HBI services has a corresponding number of pixels per symbol. A waveform generator for services having a multisymbol impulse response is described in FIG. 4.

The services with a single symbol impulse response each have a corresponding rise time, total transition time, and number of pixels per transition. This information is summarized for each service type in Table 5.

hardware complexity and channel efficiency. A sine squared transition will work for all of the various HBI services.

Data to be inserted into a HBI or overscan portion of a video field at a decoder is inserted via a data input 200 and queued up in a FIFO 202. The data is inserted into the HBI by playing back the symbols through a pixel generator. The pixel generator will be provided with the high and low levels to insert (low_amplitude_level and high_amplitude_level) via terminal 201, the first frame line number on which to insert the data (derived from field_number and start_line) via terminal 203, the transition type (derived from pulse_shape) via terminal 205, the number of symbols per line to insert (derived from word_count and remainder_count) via terminal 207, the HBI_PAM_modulus and HBI_PAM_increment via terminals 209 and 211 respectively, the symbol_to_transition_ratio via terminal 213, and the start time of the first symbol (start_sample) via terminal 215. All of this information is specific to the particular type of HBI data to be inserted, and is provided via the syntax defined above. The video data into which the HBI data is to be inserted is input to the waveform generator via terminal 217, together with the corresponding synchronization and blanking data.

The video data is provided, for example, in a conventional CCIR 656 format and is coupled to a multiplexer 254. The multiplexer also receives a gating signal from an insertion window generator 248, which enables the multiplexer to output HBI data during a time window that is, for example, 14 pixels in length. The insertion window generator 248 is responsive to the number of symbols per line input at terminal 207, the modulus and increment values input at terminals 209 and 211, respectively, and the start time input at terminal 215. These are the same signals that are input to the symbol counter 212, symbol clock generator 210 or start time detect function 214 illustrated on the left hand side of FIG. 3.

In order to insert the HBI data into the video at the proper location, a line count of the video data is maintained and compared to the desired lines of insertion. This function is provided by a line detector 244 and line time generator 246 which receives the current line information from the video

TABLE 5

HBI Service Characteristics

| Standard | Pixels/Symbol (Fraction) | Pixels/Symbol | 10%–90% Risetime | Total Transition | Pixels/Transition |
|---|---|---|---|---|---|
| Microsoft's Data Broadcasting Standard | 234/15 | 15.6 | 140 nsec | 156 nsec | 2.106 |
| Yes! Entertainment Corporation's applications | 172/9 | 19.11 | 140 nsec | 156 nsec | 2.106 |

The single symbol impulse response category of service has the characteristic that there are four or more pixels at CCIR 601 sampling rate per symbol. For single symbol impulse response services, there is no overlap from one symbol to the next. The time response of the symbol is characterized by its transition and the full amplitude portion.

The transition portion of a symbol can be downloaded as part of the service, or resident in a transition memory (ROM or RAM), such as provided in transition generator 218 in FIG. 3. The use of ROM is more efficient in terms of data via terminal 217. The line time generator 246 is enabled by line detector 244 when the lines into which HBI data are to be inserted are detected by the line detector. The line time generator then keeps track of the pixels for each video line, and provides the video line pixel count to insertion window generator 248 in order to provide the proper insertion window of, e.g., 14 active pixels.

Upon the arrival of a zero datum of a correct line, the line time generator 246 also signals a start time detector (counter) 214 which commences a down count for the start pixel time dictated by the start_sample information obtained from the syntax. The start pixel down counter 214 enables a symbol clock generator 210 which, in turn, clears a symbol counter 212.

The symbol clock generator 210 receives the HBI_PAM_modulus and HBI_PAM_increment from the syntax. Once the symbol clock generator is started in response to detector 214, the symbol time is derived by incrementing a counter by the numerator of the fraction symbol time over pixel time. The modulus of the counter is the denominator of the fraction. If desired, the numerator and denominator may be multiplied by a constant to simplify the hardware implementation.

The symbol clock generator 210 outputs a symbol clock to the FIFO enable for clocking the HBI data out from the FIFO 202. It also provides the fraction of symbol time that a current sample represents to a transition time scaling circuit 216, described below. The symbol clock runs until the symbol counter 212 counts the number of symbols specified by the word_count, remainder_count, and symbols per line from the syntax, at which time a stop signal is generated. The stop signal also clears the shift register 206 in the HBI data path.

The HBI data shifted through register 206 is monitored by a transition sign detection circuit 208. The presence or absence of a transition is detected by comparing the previous transmitted symbol with the current symbol to be transmitted. If they are the same, the same value is generated and transmitted. If there is a difference between the two symbols, then transition generator 218, which may comprise, for example, read only memory (ROM) or random access memory (RAM) is selected.

The transition generator stores data for generating multiple ramps, one for each transition type that is supported. The ramps represent the transitions for the HBI data pulses for the different HBI waveforms. The particular ramp selected for the current HBI data is determined by the transition type specified by the pulse_shape value of the syntax and input to the transition generator 218 via terminal 205. The beginning and end of the transition are dictated by the addresses input to the transition generator from the transition time scaling circuit 216, which scales the fraction of symbol time in accordance with the symbol to transition duration ratio from terminal 213 and the HBI_PAM_modulus from terminal 209. The scaled fraction of the symbol time represents the position of the sample in time within the rise time of the HBI data pulse. The transition process is repeated until detection circuit 220 determines that the address exceeds the range of the transition generator ROM or RAM, at which time the symbol has reached 100 percent of its final value. An output multiplexer (selector) 242 then selects the final value for the current and remainder of that symbol's pixels. Selection logic 222 controls the multiplexer 242 based on the initial detection of a transition by transition detection circuit 224 and the completion of the transition as determined by circuit 220.

A look up table (LUT) 236 (stored, e.g., in ROM) converts each bit of data output from shift register 206 into an eight-bit level that is ultimately scaled to the proper luminance level for the particular type of user data being processed. For example, LUT 236 can convert a binary "000" into the eight-bit word 00001111 and a binary "111" into the eight-bit word 1110000. This mapping is arbitrary, and any other desired eight-bit levels can be chosen for the binary "111" and "000" PAM symbols. The eight-bit level from the output of LUT 236 is provided to multiplexer 242 which selects this level for output unless a transition is in progress as indicated by select logic 222, in which case the transition from transition generator 218 is output. The data stream output from multiplexer 242 is then scaled to the required output levels in response to the low_amplitude_level and high_amplitude_level values delivered by the user data syntax via terminal 201. An output multiplexer 254 inserts the resultant HBI data on the video stream from terminal 217, for the insertion window provided by generator 248. The insertion window corresponds to the HBI or overscan video duration.

Multiple HBI services can be inserted with the generator of FIG. 3. Additional circuitry is necessary to load the variables required to run the generator on a line-by-line basis. The data is queued up in a common FIFO. In the implementation shown, all clocks are running at 13.5 MHz, unless otherwise indicated. This is one-half the rate of the standard MPEG, ATSC and DigiCipher system clock.

Teletext services can be supported in a similar manner as disclosed for the HBI services discussed in connection with FIG. 3. To support teletext, the waveform generator must handle an impulse response which, as noted above, is greater than one symbol. An example implementation of such a HBI waveform generator is illustrated in FIG. 4.

Figure 4:
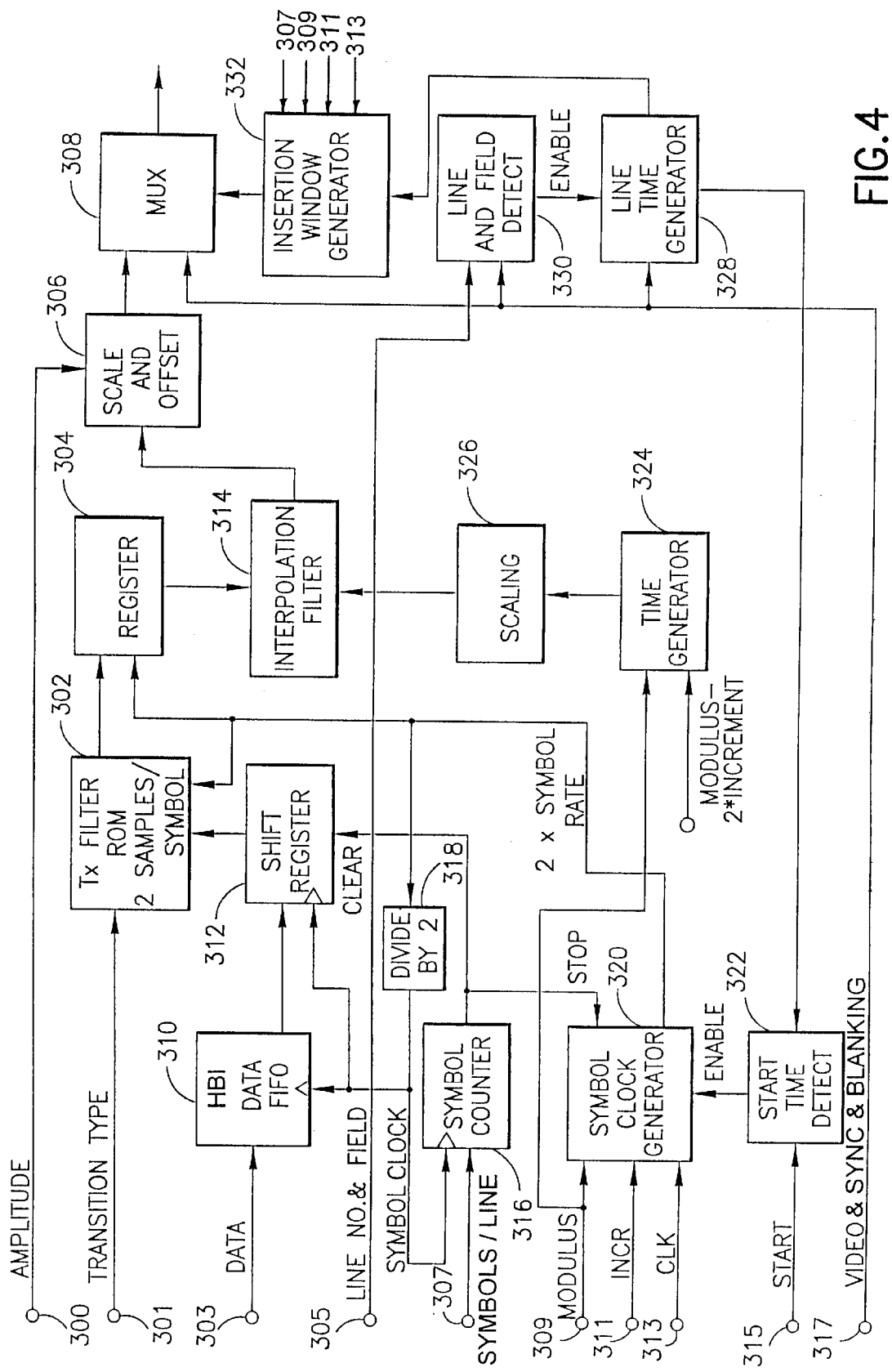
FIG. 4 is a block diagram of a second embodiment of a pixel generator for generating a digital HBI waveform from user data carried in a digital video data stream when the impulse response time of the HBI transmission standard is greater than one symbol time.

The HBI Data FIFO 310, shift register 312, symbol counter 316, symbol clock generator 320, start time detect circuit 322, scale and offset circuit 306, multiplexer (selector) 308, insertion window generator 332, line detect circuit 330 and line time generator 328 of FIG. 4 are equivalent to the similarly named elements in FIG. 3. In order to handle multisymbol impulse responses of the teletext services, which can range from 1.89 to 2.36 samples per symbol at 13.5 MHz sampling, a transmit (Tx) filter ROM 302 and interpolation filter 314 are provided. It should be appreciated that the filter 302 can also be implemented in RAM if desired, particularly if the impulse response of the desired format is to be downloaded instead of being stored locally in ROM. Any such download will be at a fixed number of samples per symbol rate. The interpolator is used to generate the 13.5 MHz rate pixels. The rate difference is the increment of the interpolator.

The data to be inserted is queued up in FIFO 310 via terminal 303. The data is inserted into the HBI or overscan region by playing back the symbols through the pixel generator. The pixel generator is provided with the start time of the first symbol pixel via terminal 315, the number of pixels per symbol (increment/modulus) via terminals 311 and 309, the high and low levels (low_amplitude_level and high_amplitude_level) to insert via terminal 300, the impulse response of the signaling system (transition type) via terminal 301, the number of symbols per line to insert via terminal 307, and the first frame and line number on which to insert the data via terminal 305.

The video data input to terminal 317 is provided in CCIR 656 format. The line count is derived and compared to the desired first line of insertion in circuits 330, 328 and 322. Upon the arrival of the correct line's zero datum, a down count for the start pixel time is started in circuit 322, which enables the symbol rate clock generator 320 at the appropriate time. The pixel window generator 332 is enabled by the line time generator 328, and is responsive to the symbols per line information provided at terminal 307, and the modulus, increment and clock values input at terminals 309, 311 and 313, respectively.

As in the waveform generator of FIG. 3, symbol time is derived by incrementing a counter by the numerator of the fraction "symbol time/pixel time", where the increment "INCR" is the numerator and the modulus of the counter is the denominator of the fraction. In addition to receiving the modulus and increment via terminals 309 and 311, respectively, the symbol clock generator 320 receives the system clock (e.g., 27 MHz) via terminal 313. By running the symbol clock generator at, e.g., 27 MHz rather than 13.5 MHz, a twice symbol rate clock is generated.

The enable input of FIFO 310 receives the symbol clock from a divider 318, which divides the output of clock generator 320 by two. This is necessary because the symbol clock generator provides a clock at twice the symbol rate. Once the specified number of symbols has been output from the FIFO, the symbol clock is disabled for the current television line. All subsequent data symbols are forced to the low (zero) state. These symbols are not data, but rather fill the balance of the pixel window with low state data.

The transmit filter ROM 302 generates two samples per symbol. The transmit shift register is loaded with transmit symbols at the symbol rate, when start time has arrived. The register is initialized to a low state on completion of each insertion. The transmit data for the duration of the impulse response is applied to the transmit ROM from shift register 312. The ROM stores a look up table of finite impulse responses (FIR), computed in advance in accordance with well known techniques. By storing the results of the FIR calculation in the ROM, it is not necessary to store the FIR coefficients to calculate the results. The appropriate FIR for the particular transition to be provided in the HBI waveform is output from the LUT when the ROM is addressed by the transition type via terminal 301.

The output of the transmit filter is provided to an interpolating filter 314 via register 304. The interpolation filter converts the 2 sample per symbol rate data to 13.5 MHz samples. An example of an appropriate interpolation filter is described by the following FIR coefficients:

$$A_0 = \alpha \mu^2 - \alpha \mu$$

$$A_1 = -\alpha \mu^2 + (\alpha+1)\mu$$

$$A_2 = -\alpha \mu^2 + (\alpha-1)\mu + 1$$

$$A_3 = \alpha \mu^2 - \alpha \mu$$

Figure 5:
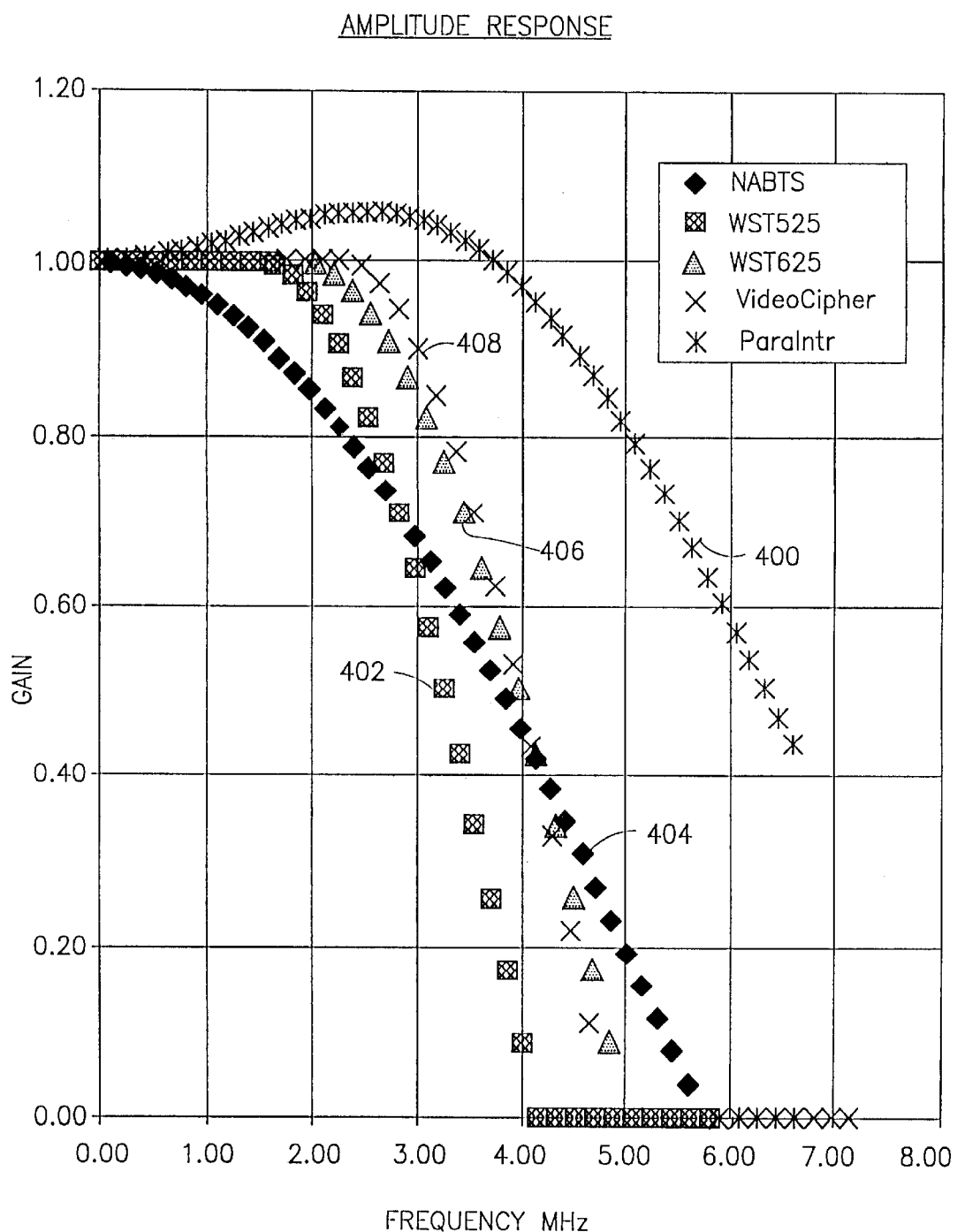
FIG. 5 is a graph illustrating the frequency response of the interpolator of FIG. 4.

$\alpha$ is defined to be 0.5. $\mu$ is the time for the sample to be interpolated. The frequency response 400 of this interpolator (ParaIntr) and the transmit impulse responses 402, 404, 406 and 408 for the various teletext standards, as well as for the VideoCipher standard proprietary to the original assignee of the present invention, are illustrated in FIG. 5. It can be seen that the interpolator clearly influences the transmitted frequency response. This frequency response error can be corrected (predistorted) in the transmit filter 302 to minimize its impact. It is a requirement that the transmit spectrum, and its images be well controlled prior to interpolation. This is the case for the described data signal types. If the pixel rate per symbol is less than about 3 samples per symbol, a greater number of samples per symbol would be required.

The data supplied to the interpolator 314 is at twice symbol rate. The actual transfers of data occur coincident with the 27 MHz tick. The interpolator output is read at 13.5 MHz.

The time interpolation variable is supplied to the filter at the 13.5 MHz rate. A time generator 324 and scaling circuit 326 allow the numerical representation of $\mu$ to be consistent with the numerical system of the filter hardware, and independent of the current modulus value.

The data stream has to be scaled to the required output levels. This can be accomplished, for example, with one multiply and addition per pixel provided by the scale and offset circuit 306. The output multiplexer 308 inserts the HBI data from the scale and offset circuit 306 on the CCIR video stream from terminal 317, for the pixel window.

There are various alternate ways to implement the functions provided by the waveform generator circuits of FIGS. 3 and 4, and the specific embodiments illustrated are by no means meant to be limiting. For example, the scaling and offset can be done earlier in the process than illustrated. In the embodiment of FIG. 4, any of a variety of known interpolators can be used. Moreover, in the multisymbol embodiment, lower data rates can be supported by having impulse responses with more samples per symbol. All of the current teletext standards are supported by two samples per symbol.

Additionally, M-level multilevel pulse amplitude modulation (PAM) can be supported using the waveform generator of FIG. 4. In such implementations, there would be log base 2 of M bits per symbol, rather than one supplied to the transmit filter ROM.

It should now be appreciated that the present invention provides a method and apparatus for communicating user information in a digital television data stream. The user information is a type that is conventionally carried as PAM data in the horizontal blanking interval or overscan region of an analog television signal. The user data is transported in a user data syntax, which has been supplemented with various fields. These include an additional data type field, field number, start line, start sample, PAM increment and modulus, amplitude values, pulse shape information, and word and remainder count information relating to the user data which is carried in the form of HBI luma PAM words and HBI luma PAM bits.

Although the invention has been described in connection with a preferred embodiment, it should be appreciated that various adaptations and modifications may be made thereto without departing from the spirit and scope of the invention as set forth in the claims.

What is claimed is:

1. A method for communicating, in a digital television data stream, information of a type conventionally carried as PAM data in a horizontal blanking interval (HBI) waveform or in video overscan regions of an analog television signal, said digital television data stream transporting data according to a convention that includes a user data syntax, said method comprising the steps of:

supplementing said user data syntax with a line indicator value specifying a first horizontal television field line in which user information is carried as PAM data in a counterpart television signal;

supplementing said user data syntax with at least one timing reference value that defines a relationship between a symbol rate of said PAM data and a reference clock of said digital television data stream; and supplementing said user data syntax with a user information field sufficient to carry the user information.

2. A method in accordance with claim 1 comprising the further step of:

supplementing said user data syntax with a start sample value indicative of a sample point at which a transition into a first luma PAM symbol is to commence in a counterpart television signal reconstructed from said digital television data stream.

3. A method in accordance with claim 2 comprising the further step of:

supplementing said user data syntax with a first amplitude value indicative of an amplitude at which luma PAM symbols are to appear in said counterpart television signal reconstructed from said digital television data stream.

4. A method in accordance with claim 3 comprising the further step of:

supplementing said user data syntax with a pulse shape value indicative of a pulse shape that is to be provided for said luma PAM symbols in said counterpart television signal reconstructed from said digital television data stream.

5. A method in accordance with claim 4 comprising the further step of:

supplementing said user data syntax with a field number indicative of a television field in which corresponding HBI data is to be inserted in said counterpart television signal reconstructed from said digital television data stream.

6. A method in accordance with claim 5 comprising the further step of:

supplementing said user data syntax with a second amplitude value indicative of a second amplitude level of said luma PAM symbols.

7. A method in accordance with claim 6 wherein said timing reference value comprises a luma PAM symbol clock increment value and a luma PAM modulus value, said symbol clock increment and modulus values being related to said PAM symbol rate and said reference clock as follows:

$$\frac{\text{increment value}}{\text{modulus value}} = \frac{\text{symbol rate}}{\text{reference clock}}.$$

8. A method in accordance with claim 6 wherein said count value comprises a word count indicating an integer number of luma PAM words that follow and a remainder count indicating a number of luma PAM bits totaling less than a full luma PAM word that follow;

said syntax thereby providing an efficient use of bandwidth by enabling remainders of less than a full PAM word to be communicated.

9. A method in accordance with claim 8 wherein said luma PAM words are each 22 bits in length, said method comprising the further step of:

inserting a marker bit after each luma PAM word to guard against a false MPEG start code.

10. A method in accordance with claim 6 wherein:

said user information is carried according to said user data syntax as luma PAM words and luma PAM bits;

each luma PAM word comprises a string of luma PAM symbols with the first bit corresponding to a first luma PAM symbol to be reconstructed on video lines as displayed from left to right and then top to bottom; and each luma PAM bit represents a luma PAM symbol to be reconstructed on said video lines;

said luma PAM bits being provided in the order in which their symbols are to be reconstructed on said video lines subsequent to symbols reconstructed from any luma PAM words, as displayed from left to right and then top to bottom.

11. A method in accordance with claim 1 wherein:

said PAM data is carried in a luminance (luma) portion of said television signal; and said timing reference value comprises a luma PAM symbol clock increment value and a luma PAM symbol clock modulus value, said symbol clock increment and modulus values being related to said PAM symbol rate and said reference clock as follows:

$$\frac{\text{increment value}}{\text{modulus value}} = \frac{\text{symbol rate}}{\text{reference clock}}.$$

12. A method in accordance with claim 1 wherein:

said PAM data is carried in a luminance (luma) portion of said television signal; and said count value comprises a word count indicating an integer number of luma PAM words that follow and a remainder count indicating a number of luma PAM bits totaling less than a full luma PAM word that follow;

said syntax thereby providing an efficient use of bandwidth by enabling remainders of less than a full PAM word to be communicated.

13. A method in accordance with claim 1 wherein:

said PAM data is carried in a luminance (luma) portion of said television signal;

said user information is carried according to said user data syntax as luma PAM words and luma PAM bits;

each luma PAM word comprises a string of luma PAM symbols with the first bit corresponding to a first luma PAM symbol to be reconstructed on a video line as displayed from left to right and then top to bottom; and each luma PAM bit represents a luma PAM symbol to be reconstructed on said video line;

said luma PAM bits being provided in the order in which their symbols are to be reconstructed on said video lines of said field, starting on said first horizontal television field line subsequent to symbols reconstructed from any luma PAM words, as displayed from left to right and then top to bottom.

14. Receiver apparatus for decoding, from a digital television data stream, user information of a type conventionally carried as PAM data in a horizontal blanking interval (HBI) waveform or video overscan region of an analog television signal, said digital television data stream transporting data according to a convention that includes a user data syntax, comprising:

a syntax processor for detecting information carried in accordance with said user data syntax, said information including:

a first value identifying first horizontal television line(s) in which particular user information is carried in a counterpart television signal, a second value identifying a relationship between a PAM symbol rate of said counterpart television signal and a digital television data reference clock, a third value indicating an amount of user information carried in the digital television data stream, and said user information;

a reconstruction processor responsive to said first, second and third values for formatting said user information into HBI PAM data; and a HBI inserter for inserting said HBI PAM data into a television signal reconstructed from said digital television data stream.

15. Apparatus in accordance with claim 14 wherein:

said syntax processor detects a start sample value indicative of a sample point at which a transition into a first PAM symbol is to commence on each line in said reconstructed television signal; and said HBI inserter is responsive to said start sample value for inserting said PAM data into said reconstructed television signal.

16. Apparatus in accordance with claim 15 wherein:

said syntax processor detects a first amplitude value indicative of an amplitude at which PAM symbols are to appear in said reconstructed television signal; and said reconstruction processor is responsive to said first amplitude value to provide said HBI PAM data at said amplitude.

17. Apparatus in accordance with claim 16 wherein:

said syntax processor detects a pulse shape value indicative of a pulse shape that is to be provided for said PAM symbols in said reconstructed television signal; and said reconstruction processor is responsive to said pulse shape value to provide said HBI PAM data with said pulse shape.

18. Apparatus in accordance with claim 17 wherein:

said syntax processor detects a field number indicative of a television field in which corresponding HBI data is to be inserted in said reconstructed television signal; and said HBI inserter is responsive to said field number for inserting said corresponding HBI data into a proper field.

19. Apparatus in accordance with claim 18 wherein:

said syntax processor detects a second amplitude value indicative of a second amplitude at which PAM symbols are to appear in said reconstructed television signal; and said reconstruction processor is responsive to said first and second amplitude values to provide said HBI PAM data at said first and second amplitudes.

\* \* \* \* \*